United States Patent
Feder et al.

(10) Patent No.: US 8,516,136 B2
(45) Date of Patent: Aug. 20, 2013

(54) WEB-BASED OVER-THE-AIR PROVISIONING AND ACTIVATION OF MOBILE TERMINALS

(75) Inventors: Peretz Moshe Feder, Englewood, NJ (US); Paolo Narvaez, Madison, NJ (US)

(73) Assignee: Alcatel Lucent, Paris (FR)

( * ) Notice: Subject to any disclaimer, the term of this patent is extended or adjusted under 35 U.S.C. 154(b) by 762 days.

(21) Appl. No.: 11/826,937

(22) Filed: Jul. 19, 2007

(65) Prior Publication Data

US 2009/0018849 A1  Jan. 15, 2009

Related U.S. Application Data (60) Provisional application No. 60/958,954, filed on Jul. 9, 2007.

(51) Int. Cl.
*G06F 15/16* (2006.01)

(52) U.S. Cl.
USPC ........ 709/229; 705/317; 455/419; 455/414.1; 455/456.3; 455/461; 370/310; 370/230; 370/338; 370/349

(58) Field of Classification Search
USPC .............. 709/229; 705/1; 455/411, 456.3, 455/414.1; 370/310
See application file for complete search history.

(56) References Cited

U.S. PATENT DOCUMENTS

| | | | |
|---|---|---|---|
| 6,636,894 B1 | 10/2003 | Short et al. | 709/225 |
| 7,007,080 B2 | 2/2006 | Wilson | 709/221 |
| 7,103,641 B2 | 9/2006 | Brannock | |
| 7,603,562 B2 | 10/2009 | Flynn | |
| 7,809,366 B2 * | 10/2010 | Rao et al. | 455/419 |
| 2002/0105931 A1 * | 8/2002 | Heinonen et al. | 370/338 |
| 2004/0242209 A1 * | 12/2004 | Kruis et al. | 455/414.1 |
| 2005/0060361 A1 | 3/2005 | Chatrath et al. | 709/200 |
| 2005/0075115 A1 * | 4/2005 | Corneille et al. | 455/456.3 |
| 2005/0111382 A1 | 5/2005 | Le et al. | |
| 2006/0039561 A1 * | 2/2006 | Ypya et al. | 380/270 |
| 2006/0187858 A1 | 8/2006 | Kenichi et al. | 370/254 |
| 2006/0256731 A1 | 11/2006 | Jennings et al. | |
| 2007/0058545 A1 * | 3/2007 | Nookala et al. | 370/230 |
| 2007/0061878 A1 | 3/2007 | Hagiu et al. | |
| 2007/0133763 A1 | 6/2007 | D'Angelo et al. | 379/93.02 |

(Continued)

FOREIGN PATENT DOCUMENTS

| | | |
|---|---|---|
| CN | 1981554 A | 6/2007 |
| JP | 2006099721 A | 4/2006 |

(Continued)

OTHER PUBLICATIONS

International Preliminary Report on Patentability dated Oct. 9, 2009.

(Continued)

*Primary Examiner* — Kyung H Shin
(74) *Attorney, Agent, or Firm* — Harness, Dickey & Pierce (57) ABSTRACT

In a method for over-the-air provisioning of a mobile terminal in a wireless network, a first transaction between the mobile terminal and a web server is performed via an external port. During the first transaction, the mobile terminal obtains user subscription information for subscribing to network services. During a second transaction between the web server and the mobile terminal, the mobile terminal obtains device management information for authorizing the mobile terminal to access the network services. The first and second transactions are conducted via the same external port.

22 Claims, 2 Drawing Sheets

(56) References Cited

U.S. PATENT DOCUMENTS

| | | | |
|---|---|---|---|
| 2007/0281691 A1 | 12/2007 | Svensson | |
| 2007/0283385 A1 | 12/2007 | Qiu et al. | |
| 2008/0022090 A1 | 1/2008 | Kishimoto | |
| 2008/0049649 A1* | 2/2008 | Kozisek et al. | 370/310 |

FOREIGN PATENT DOCUMENTS

| | | |
|---|---|---|
| JP | 2006155350 A | 6/2006 |
| JP | 2007094903 A | 4/2007 |
| JP | 2007511971 A | 5/2007 |
| WO | WO 00/63779 | 10/2000 |
| WO | WO-2007045085 A1 | 4/2007 |

OTHER PUBLICATIONS

Stephanie Lin et al., "An Introduction to OMA Device Management," IBM, Oct. 31, 2006.
Ronald Kutschke, "Auto-Configuration Management in Home Networks," Alcatel, 2006.
Jeff Bernstein & Tim Spets, "Technical Report: DSL Forum TR-069 CPE WAN Management Protocol," May 2004.
Ronald Kutschke et al., "Diplomarbeit: IM Studiengang Medieninformatik," Alcatel, Mar. 31, 2006.
English Translation of "Diplomarbeit: IM Studiengang Medieninformatik," Alcatel, Mar. 31, 2006.
Adwankar S. et al., "Universal Manager and Seamless Management of enterprise Mobile and Nonmobile Devices," Mobile Data Management, pp. 320-331, Jan. 19, 2004.
Blush S. et al., "Radio Software Download for Commercial Wireless Reconfigurable Devices," IEEE Communications Magazine, IEEE Service Center, vol. 42, No. 3, pp. S26-S32, Mar. 1, 2004.
International Search Report for corresponding International Application No. PCT/US2008/008181 dated Jan. 14, 2009.
Written Opinion for corresponding International Application No. PCT/US2008/008181 dated Jan. 14, 2009.
U.S. Office Action dated Feb. 1, 2011 for co-pending U.S. Appl. No. 12/153,486.
US office Action dated Dec. 20, 2011 for co-pending U.S. Appl. No. 12/153,486.
Japanese Office Action dated Feb. 7, 2013 for corresponding Japanese Application No. 2010-516027 (full translation provided).
Chinese Office Action dated May 6, 2013 for related Chinese Application No. 200880023680.1 (full translation provided).

* cited by examiner

WEB-BASED OVER-THE-AIR PROVISIONING AND ACTIVATION OF MOBILE TERMINALS

PRIORITY STATEMENT

This non-provisional U.S. patent application claims priority under 35 U.S.C. §119(e) to provisional patent application Ser. No. 60/958,954, to Peretz Feder and Paolo Narvaez, filed on Jul. 9, 2007, the entire contents of which are incorporated herein by reference.

BACKGROUND OF THE INVENTION

Figure 1:
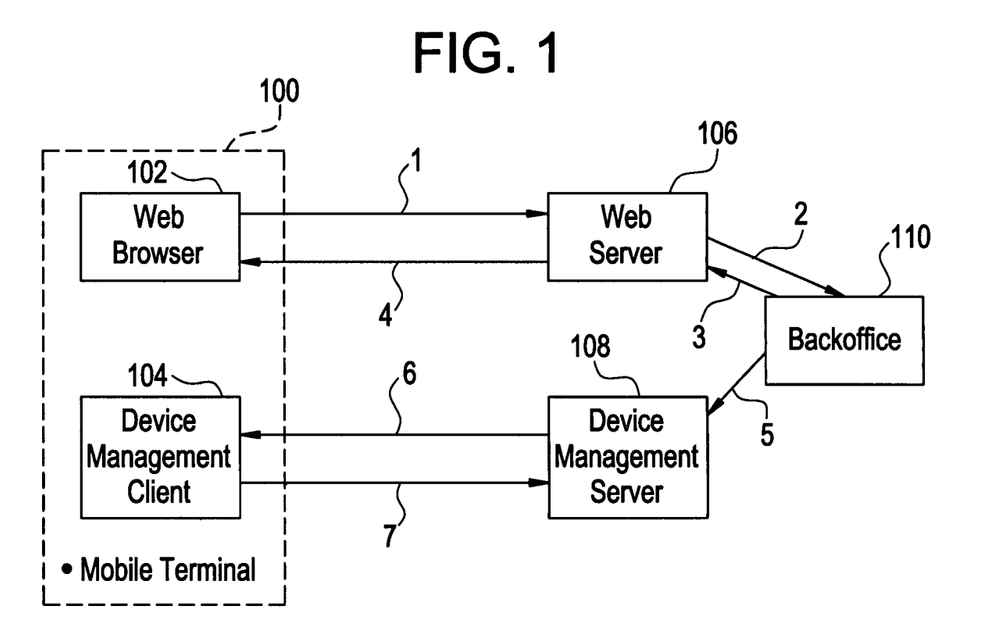
FIG. 1 illustrates a network and communication flow diagram in accordance with the conventional art.

FIG. 1 illustrates a portion of a conventional WiMAX communications network. As shown, the conventional WiMAX network includes a mobile terminal 100 in two-way communication with a web server 106 and a device management server 108. The two-way communication may take place over one or more wireless links, using any suitable wireless communication protocol (e.g., WiMAX, EV-DO, UMTS, etc.). Each of the web server 106 and the device management server 108 communicate with a back office 110 via one or more wired links.

The mobile terminal 100 may be any electronic device having wireless communication capability. For example, the mobile terminal 100 may be a cellular phone, personal digital assistant (PDA), laptop computer, desktop computer, etc. The mobile terminal 100 may further include a web browser or web client 102 and a device management client 104. Conventionally, within the mobile terminal 100, the web browser 102 communicates with the web server 106 and the device management client 104 communicates with the device management server 108. The web browser 102 and the device management client 104 operate independently and do not share or transfer information between one another.

Before the mobile terminal 100 is capable of accessing network services (e.g., multimedia services such as VoIP, Video, Internet, etc.) provided by a particular service provider, the mobile terminal 100 must be authorized and configured appropriately to do so. This is referred to as activation and initial configuration. Such activation and initial configuration over a wireless link is referred to as over-the-air activation and initial configuration.

Conventionally, over-the-air activation and initial configuration of mobile terminal 100 are performed in three steps:
1) subscription;
2) bootstrapping; and
3) device management.

Subscription is the process by which a user subscribes to network services provided by a service provider via a mobile terminal. Bootstrapping is a process by which the service provider provides some initial user credentials to the mobile terminal after the subscription step is complete. Device management is a session in which the service provider downloads and continuously updates relevant device configurations for accessing the service provider's network services.

A conventional over-the-air provisioning process will be described with regard to the communication flow embedded in FIG. 1. In FIG. 1, the arrows and corresponding numbers refer to message or communication flows.

In FIG. 1, messages 1-4 are considered part of the subscription step, while messages 5-6 are considered part of the bootstrapping step. Message 7 begins a standard device management process, which is well-known in the art. Various existing standards protocols, such as simple network management protocol (SNMP), Open Mobile Alliance Device Management (OMA-DM), and TR-069, may be used to provide device management.

Referring to FIG. 1, (at 1) the mobile terminal 100 transmits one or more messages to the web server 106 (also referred to as a provisioning server) via the web browser 102. The message may be in accordance with the well-known hyper-text transfer protocol (HTTP). These messages may include subscription information, such as, the user's billing address, credit card information, etc.

In a more specific example, upon attempting to access the Internet, the mobile terminal 100 may be hot-lined or re-directed to the web server 106. The web server displays various options for pay-for-access to network services. The web server 106 sends a web page to the web browser 102 with this information. The web browser 102 presents the received web page to the user via a display.

Upon receiving this web page, the user enters personal and billing information at the web page (e.g., via a keyboard, mouse, mobile device keyboard, etc.) and submits the information to the web server 106. In most cases, the information is submitted by clicking a "SUBMIT" link. The submission of the user's information enters the user into a contract with the service provider. In most cases, this contract entails the user paying for access to the service provider's network services.

Still referring to FIG. 1, upon receiving the subscription information from the mobile terminal 100, the web server 106 sends the user's subscription information to the back-office 110 (at 2). A back-office is a term used to describe various elements used by a service provider to handle subscriber information. In one example, back-office 110 may comprise a collection of servers and computers at a single or multiple network entities within a service provider's core network. Operations and processes performed at the back-office 110 may be performed as computer implemented processes with or without human operator intervention.

Still referring to FIG. 1, the back-office 110 adds the user to a subscriber database, and upon completion, acknowledges that the subscription was successful by sending an acknowledgement message to the web server 106 (at 3). Upon receiving the successful subscription acknowledgement from the back-office 110, the web server 106 transmits a web page back to the web browser 102 (at 4). The web browser 102 displays the web page to the user via the display. The web page may include text indicating to the user that the subscription process was successful.

Still referring to FIG. 1, the back-office 110 then populates the device management server 108 with user credentials for the newly subscribed user (at 5). The device management server 108 then pushes the supplied user credentials to the device management client 104 (at 6) thereby bootstrapping the mobile terminal 100. In response to receiving the user credentials, the device management client 104 contacts the device management server to begin a device management session (at 7).

Conventionally, subscription and bootstrapping are two separate and independent processes handled by different systems and network elements. That is, the subscription step is handled by the web browser 102 and the web server 104, while the bootstrapping step is handled by the device management client 104 and the device management server 108. Performing these two operations separately, however, has a number of drawbacks.

First, a relatively large number of network elements and systems need to be deployed in the network by the service provider. Secondly, a relatively high degree of coordination between the subscription and bootstrapping systems is required. In addition, pushing the initial user credentials to a mobile terminal may be very difficult (even impossible) when the mobile terminal is behind a firewall. Moreover, separate bootstrapping processes require separate encryption mechanisms to guarantee security of the delivered user credentials. In most cases, these encryption mechanisms are custom-designed for each type of access technology. Conventionally, no universal mechanism to perform bootstrapping exists.

SUMMARY OF THE INVENTION

Example embodiments combine subscription and bootstrapping processes into a simplified combined process based on a common web browser model. The combined subscription-bootstrapping may be performed by any mobile terminal equipped with a web browser using any wireless access technology.

According to at least one example embodiment, after the user provides his/her personal and/or billing information and has agreed to the terms of the contract (hereinafter referred to as the "hot-lined subscription step"), the service provider may provide an HTML page to the user with a link. When clicked, the link redirects the browser to an internal HTTP port (on localhost) that will redirect or point to a device management handler, which wakes up the device management client within the mobile terminal. The device management session may then begin.

According to example embodiments, any required bootstrapping information, such as username and password, may be passed directly from the service provider (e.g., the back-office) to the mobile terminal via an open hyper-text mark-up language (HTML) link (e.g., via a web server) established during subscription.

At least one example embodiment provides a method for over-the-air provisioning of a mobile terminal in a wireless network. According to this method, the mobile terminal may transmit at least one first message to a web server via an external port. The first message may include user subscription information for subscribing to network services. The mobile terminal may receive at least one second message from the web server via the same external port. The at least one second message may include information for initial configuration of the device management client.

At least one other example embodiment provides a mobile terminal for accessing the wireless network. The mobile terminal may include a web module and a device management module. The web module may be configured to transmit at least one first message to a web server via an external port. The first message may include user subscription information for subscribing to network services.

The web module may be further configured to receive at least one second message from the web server via the same external port. The at least one second message includes device management information to initially configure the device management client. The web module may pass the device management information to the device management module, which may conduct a device management session based on the received device management information.

At least one other example embodiment provides a method for over-the-air provisioning of a mobile terminal in a wireless network. According to this method, the web server may receive at least a first message from the mobile terminal via an external port at the mobile terminal. The at least one first message may include user subscription information for subscribing to network services. The web server may send at least one second message to the mobile terminal via the same external port in response to the received at least one first message. The at least one second message may include device management information.

At least one other example embodiment provides a method for over-the-air provisioning of a mobile terminal in a wireless network. According to this method, a first transaction between the mobile terminal and a web server may be performed via an external port. During the first transaction, the mobile terminal may obtain user subscription information for subscribing to network services.

A second transaction between the web server and mobile terminal may be conducted via the same external port. During the second transaction, the mobile terminal may obtain device management information.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Various example embodiments of the present invention will now be described more fully with reference to the accompanying drawings in which some example embodiments of the invention are shown. In the drawings, the thicknesses of layers and regions are exaggerated for clarity.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 2:
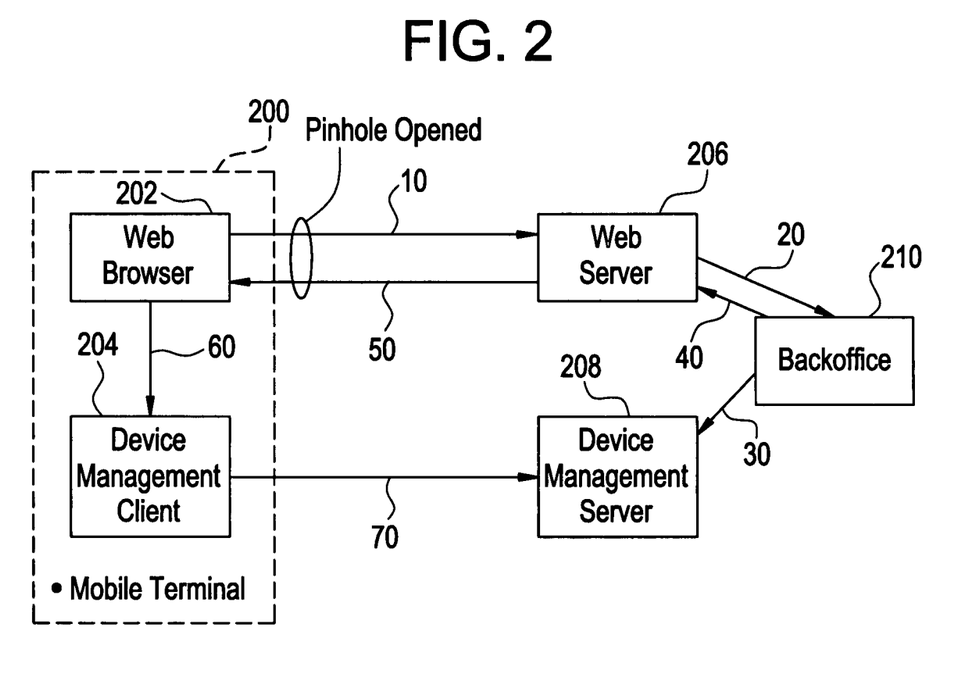
FIG. 2 illustrates a network and communication flow diagram in accordance with an example embodiment.

FIG. 2 illustrates a portion of a communications network according to an example embodiment. Although example embodiments will be described with regard to the WiMAX protocol, example embodiments are applicable to other protocols such as Universal Mobile Telecommunications Standard (UMTS), Enhanced Video Data Only (EV-DO), Ultra Mobile Broadband (UMB), 3GPP Long Term Evolution (3GPP-LTE). In addition, although example embodiments will be described with regard to wireless networks and network services, example embodiments may be equally applicable to wired, packet-switched networks and the like.

Referring to FIG. 2, the network may include a mobile terminal 200 in two-way communication with a web server 206 and a device management server 208. The mobile terminal 200 may communicate with the web server 206 via one or more wireless communications links. The mobile terminal may also communicate with the device management server 208 via one or more wireless communications links. The wireless communications links may use any suitable wireless communication protocol (e.g., UMTS, EV-DO, UMB, LTE, WiMAX, etc.). Because wireless communication protocols such as UMTS, EV-DO, UMB, LTE and WiMAX are well-known, a detailed discussion will be omitted for the sake of brevity.

Although only a single mobile terminal is shown in FIG. 2, methods and processes discussed herein may be performed by a plurality of mobile terminals concurrently. That is, for example, each of the web server 206 and the device management client 208 may communicate with a plurality of mobile terminals simultaneously or concurrently.

Still referring to FIG. 2, each of the web server 206 and the device management server 208 communicate with a back-office 210 via one or more wired links using any suitable communications protocol. The back-office 210 in FIG. 2 may be the same as the back-office 110 described above with regard to FIG. 1.

The mobile terminal 200 may be any electronic device having wireless communication capability and being capable of running a web browser (or web client) and device management client. For example, the mobile terminal 200 may be a cellular phone, personal digital assistant (PDA), laptop computer, desktop computer, etc.

As shown, the mobile terminal 200 may include a web-browser 202 and a device management client 204. As is well-known in the art, web browsers and device management clients may be implemented in the form of computer software. Herein, the web browser may be referred to as a web client or web module, and the device management client may be referred to as a device management module.

Within the mobile terminal 200, the web browser 202 communicates with the web server 206 and the device management client 204 communicates with the device management server 208. In addition, the web browser 202 and the device management client 204 may share and transfer information between one another, which will be described in more detail below.

A method for over-the-air provisioning in accordance with an example embodiment will be described with regard to the communication flow diagram embedded in FIG. 2.

Referring to FIG. 2, (at 10) the mobile terminal 200 may initiate a first transaction with the web server 206 (also referred to as a provisioning server) via the web browser 202. The transaction may be in accordance with the well-known HTTP protocol. Information transferred during the aforementioned transaction may include user subscription information such as a user's personal, billing, credit card information, etc.

As discussed herein a transaction may include one or more messages transmitted between entities, such as, the mobile terminal 200 and the web server 206.

A more specific example of a transaction between the web browser 202 and the web server 206 will now be described. It will be understood, however, that this example is for the sake of clarity, and should not limit example embodiments discussed herein.

In this more specific example, when the mobile terminal 200 attempts to access the Internet, the mobile terminal 200 may be re-directed or hot-lined to web server 206. Upon being directed to the web server 206, the web browser 202 presents a web page to the user. The web page may prompt the user to enter his/her user subscription information. User subscription information may include one or more of the user's personal information (e.g., name, address, phone number), billing information (e.g., billing address), credit card information, etc.

The user enters the required user subscription information at the web page and submits the user subscription information to the web server 206. In most cases, the user subscription information is submitted by clicking a link embedded in the web page and presented to the user. The submission of the user's information enters the user into a contract with the service provider. In most cases, this contract entails the user paying for access to the service provider's network.

Still referring to FIG. 2, if the mobile terminal 200 is behind a firewall, the mobile terminal 200 may connect to the web server 206 and conduct the transaction via a single external port referred to as a "pin-hole." In this example, when the web browser 202 initiates the transaction with the web server 206, the firewall opens the pin-hole to allow the response from the web server 206 to be transmitted to the web browser 202 through the same external port. This pin-hole remains open for a first time period. The first time period may be determined by a network operator or administrator as desired.

As is well-known, a firewall typically blocks all incoming packets. That is, for example, the firewall blocks packets with an external source (e.g., outside the firewall), and an internal destination (e.g., inside the firewall). At the same time, outgoing packets (e.g., packets with an internal source and external destination) are allowed to traverse the firewall freely. In order to open the pin-hole and enable bi-directional communication through an external port for the first time period, a stateful firewall may use past knowledge of the source address, destination address, source port and destination port of outgoing packets to determine which incoming packets should be allowed access at a later time. As is well-known in the art, a stateful firewall is any firewall that performs stateful packet inspection (SPI) or stateful inspection, each of which is also well-known in the art.

For example, if a TCP SYN packet (e.g., having source address A, source port X, destination address B, destination port Y) is detected by the firewall's SPI in the outgoing direction, the stateful firewall will open a pin-hole (e.g., allow traffic to pass through the firewall in both directions through the same external port) for a first time period. This pin-hole allows incoming TCP packets (e.g., with source address B, source port Y, destination address A, destination port X) to traverse the firewall and reach the protected device behind the firewall. In this particular example, the pin-hole allows only packets having source address B, source port Y, destination address A, destination port X through, while blocking all other types of incoming packets.

Still referring to FIG. 2, upon receiving the subscription information from the mobile terminal 200, the web server 206 sends the received subscription information to the back-office 210 (at 20). The back-office 210 adds the user to a subscriber database, and upon completion, (at 30) populates the device management server 208 with the generated user credentials. In subscribing the user, the back-office 210 establishes a record for the user and ensures the user will be recognized in the future by all network elements with which the user may interact. According to example embodiments, the subscriber database may be any suitable database associating the user with generated user credentials.

The back-office 210 acknowledges that the subscription was successful by performing an acknowledgement transaction with the web server 206 (at 40). In at least one example embodiment, the back-office 210 may send an acknowledgement message to the web server 206. After completing the acknowledgement transaction with the web server 206, the web server 206 may initiate and conduct a second transaction with the web browser 202 (at 50). The second transaction may be conducted via the above-described open pin-hole. For example, upon receiving the successful subscription acknowledgement message from the back-office 210, the web server 206 transmits a subscription process acknowledgement message to the web browser 202.

In at least one example embodiment, the subscription process acknowledgement message may be in the form of a web page. The web-page may include text indicating to the user that the subscription process was successful, and device management information (also referred to as device management parameters). The device management information refers to information used by the device management client.

In one example, the device management information may include user credentials (e.g., username and password), an internal TCP port to connect to (e.g., 8000), a Uniform Resource Locator (URL) of the device management server 208, etc. According to example embodiments, any or all of the device management information may or may not be visible to the user. The device management information may be sent securely through the above-described pin-hole or external port via a secure HTTP connection (https).

Still referring to FIG. 2, after receiving the device management information from the web server 206, the web browser 202 passes the device management information to the device management client 204 (at 60). The web browser 202 may pass the device management information to the device management client 204 using any suitable method.

In one example, device management information may be passed between the web browser 202 and the device management client 204 via an internal POST or GET HTTP message or messages from the web browser 202 to the device management client 204. Because internal POST or GET HTTP messages are well-known, a detailed discussion will be omitted for the sake of brevity. The device management client 204 may require an open socket to listen to such POST or GET HTTP message.

The web-page provided by the web server 206 may be an HTML page including the user credentials and having an embedded link. The link, when clicked by the user, may re-direct the web browser 202 to an internal TCP port (on localhost), which is being monitored by device management client 204 via a handler (not shown). The handler is a component of the device management client 204 used by the device management client 204 to listen to a given internal port. The device management handler wakes up the device management client 204 within the mobile terminal 200 and provides the device management parameters (e.g., including the user credentials) to the device management client 204. The device management session may then begin.

Below is an example of HTML code that may be used to pass device management information to the web browser 202 and be presented to the user.

```
<A href="http://localhost:8000/
start_client?username=user1&password=secret">
Click Here </A>
```

The above text may be appended to an HTML file sent to the web browser 202 by the web server 206. As discussed herein, with the remaining portion of the HTML file, the device management information may traverse the device firewall because it is a response to the transaction between the web browser 202 and the web server 206. When displayed to the user, the user may see the web page response with some additional text, for example, "CLICK HERE." When the user clicks on the "CLICK HERE" text, the web browser 202 may automatically generate a new request to port 8000 on the mobile terminal 200. On port 8000, the device management client 204 may be listening and may receive the device management information, for example, the user credentials from the web browser 202.

In at least one other example embodiment, a browser helper application may be used. For example, the web browser 202 may be configured to recognize the provisioning file type downloaded from the web server 206. After downloading the provisioning file, the file may launch the device management client 204 with the relevant user credentials.

More particularly, this example embodiment may operate in a manner similar to the manner in which a conventional web browser launches an appropriate application in response to downloading a special type of file (e.g., .DOC file, .PDF file, etc.).

In yet another example embodiment, a web application (such as Java or .NET) may be used. In this example, the web browser 202 may download a Java application from the web server 206. The Java application may run in the web browser 202 and contact the device management client 204 internally (e.g., via any well-known type of inter-process communication channel) to pass the relevant user credentials. This may not require the device management client 204 to be listening on a TCP socket. The Java application may also assist the user in performing the subscription.

In yet another example embodiment, an executable (EXE) application may be used. In this example, the web browser 202 may download a partial or entire device management client application (e.g., OMA-DM client) from the web server 206. After downloading, the user may launch the device management client application directly. The device management client application may provide the device management client 204 with the appropriate configuration for the mobile terminal 200. Because device management clients such as the OMA-DM client are well-known, a detailed discussion will be omitted for the sake of brevity. This method may be relatively flexible in that a custom application may be used for each mobile terminal 200. However, the user may need to manually authorize and launch the downloaded application.

As is well-known in the art, web browsers may be capable of downloading and running scripts/applications automatically on a mobile terminal. Accordingly, in still another example embodiment, an automatic download and installation framework may be used. Because automatic download and installation frameworks are well-known in the art, a detailed discussion thereof will be omitted for the sake of brevity.

In this example, before such mechanisms may be used, the web server 206 and/or its public certificate may need to be configured as "trusted," by the web browser 202 and the application to be downloaded needs to be signed by a trusted source. In this example embodiment, the automatic download may be triggered by web server 206 at the end of the subscription process.

Returning to FIG. 2, in response to receiving the user credentials from the web server 202, the device management client 204 contacts the device management server 208 to begin a device management session (at 70) using the device management information supplied by the web browser 202 (e.g., username, password, DM server URL, etc.).

According to one or more example embodiments described herein, a mobile terminal may initially contact a web server via an external port or pinhole (e.g., through a firewall). The web server may send device management information to the mobile terminal via the same external port or pin-hole through which the mobile terminal initially contacted the web server. As is well-known in the art, firewall software may be configured to recognize and associate a particular external port or pin-hole with a particular source address, source port, destination address and destination port of the initial contact messages sent by the mobile terminal to the web server.

The firewall software may recognize a message from the web server to the mobile terminal as having a source address, source port, destination address and destination port opposite to that of the source address, source port, destination address and destination port included in the initial message or messages from the mobile terminal. Once recognized as opposites, the firewall software may allow the messages from the web server to pass through the firewall to the mobile terminal.

The invention being thus described, it will be obvious that the same may be varied in many ways. Such variations are not to be regarded as a departure from the invention, and all such modifications are intended to be included within the scope of the invention.

We claim:

1. A method for over-the-air provisioning of a mobile terminal with a web server in a wireless network operated by a service provider, the method comprising:
   initiating, by a web browser of the mobile terminal, device management information exchange by transmitting at least one first message to the web server via an external port of the mobile terminal, the at least one first message including user subscription information for an initial over-the-air provisioning of the mobile terminal by the web browser with the web server; and
   receiving, at the web browser of the mobile terminal, at least one second message from the web server via the same external port of the mobile terminal, the at least one second message including device management information allowing the mobile terminal to access a corresponding network service,
   wherein the external port is a pin-hole through a firewall between the mobile terminal and the web server,
   the mobile terminal having not been activated for service by the service provider prior to the transmitting and receiving of the respective first and second messages,
   wherein the second message includes one of a web application, an executable application and an automatic download and installation framework, the method further comprising,
   the web application, the executable application, or the automatic download and installation framework automatically contacting a device management module and passing the device management information to the mobile terminal.

2. The method of claim 1, wherein the user subscription information includes at least one of a user's name, billing address and credit card information.

3. The method of claim 1, wherein the device management information includes at least one of user credentials, an internal Transmission Control Protocol (TCP) port and a Uniform Resource Locator (URL) of a device management server.

4. The method of claim 1, wherein the at least one first message is a hyper-text transfer protocol message.

5. The method of claim 1, wherein the at least one second message is transmitted via a secure hyper-text transfer protocol (https) message.

6. The method of claim 1, wherein the at least one second message is received at a web module of the mobile terminal, the at least one second message includes a web page having an embedded link, the embedded link is associated with an internal transmission control protocol port at a device management module of the mobile terminal, and wherein the method further comprises:
   passing the device management information from the web module to the device management module in response to activation of the link by the user.

7. The method of claim 1, wherein the at least one second message includes a provisioning file, and the method further comprising:
   launching the received provisioning file to obtain the device management information.

8. The method of claim 1,
   wherein the web application or the executable application passes the device management information to the mobile terminal via an inter-process communications channel.

9. The method of claim 1, wherein the at least one second message including the device management information is received at a web browser module of the mobile terminal, the method further comprising:
   passing the device management information from the web browser to a device management client within the mobile terminal through communications within the mobile terminal; and contacting a device management server to begin a device management session using the device management information from the web browser.

10. The method of claim 1, wherein the transmitting of the at least one first message and the receiving of the at least one second message occurs before the mobile terminal accesses any network services of the wireless network.

11. A mobile terminal for accessing a wireless network operated by a service provider, the mobile terminal comprising:
   a tangible electronic device with a memory,
   a web module, implemented on the electronic device, configured to initiate device management information exchange by transmitting at least one first message to a web server in the wireless network via an external port of the mobile terminal, the at least one first message including user subscription information for an initial over-the-air-provisioning of the mobile terminal by the web module with the web server,
   the web module being further configured to receive at least one second message from the web server via the same external port of the mobile terminal, the at least one second message including device management information allowing the web module to access a corresponding network service from the web server,
   wherein the external port is a pin-hole through a firewall between the mobile terminal and the web server,
   the mobile terminal having not been activated for service by the service provider prior to the transmitting and receiving of the respective first and second messages,
   wherein the second message includes one of a web application, an executable application and an automatic download and installation framework,
   the web module being further configured to run the web application, the executable application or the automatic download and installation framework and contact a device management module to pass the device management information to the mobile terminal.

12. The mobile terminal of claim 11, further comprising:
   the device management module configured to contact a device management server and conduct a device management session; and wherein
   the web module is further configured to pass the device management information received from the web server to the device management module via an internal port.

13. The mobile terminal of claim 11, wherein the web module passes the device management information to the mobile terminal via an internal hyper-text transfer protocol message.

14. The mobile terminal of claim 11, wherein the web module is further configured to transmit the at least one first message and receive the at least one second message before the mobile terminal accesses any network services of the wireless network.

15. A method for over-the-air provisioning of a mobile terminal with a web server in a wireless network operated by a service provider, the method comprising:
   receiving, at the web server, at least a first message from a web browser of the mobile terminal via an external port at the mobile terminal, the at least one first message including user subscription information for initiating device management information exchange for an initial over-the-air provisioning of the mobile terminal by the web browser with the web server; and
   sending, in response to the received at least one first message, at least one second message from the web server to the web browser via the same external port at the mobile terminal, the at least one second message including device management information allowing the mobile terminal to access a corresponding network service,
   wherein the external port is a pin-hole through a firewall between the mobile terminal and the web server,
   the mobile terminal having not been activated for service by the service provider prior to the transmitting and receiving of the respective first and second messages,
   wherein the second message includes one of a web application, an executable application and an automatic download and installation framework, the method further comprising,
   the web application, the executable application, or the automatic download and installation framework automatically contacting a device management module and passing the device management information from the web server to the mobile terminal.

16. The method of claim 15, wherein the user subscription information includes at least one of a user's name, billing address and credit card information.

17. The method of claim 15, wherein the device management information includes at least one of user, an internal TCP port and a Uniform Resource Locator (URL) of a device management server.

18. The method of claim 15, wherein the at least one first message is an HTTP message.

19. The method of claim 15, wherein the at least one second message is transmitted via a secure HTTP (https) message.

20. The method of claim 15, wherein the receiving of the at least one first message and the sending of the at least one second message occurs before the mobile terminal accesses any network services of the wireless network.

21. A method for over-the-air provisioning of a mobile terminal with a web server in a wireless network operated by a service provider, the method comprising:
   performing a first transaction between a web browser of the mobile terminal and the web server via an external port of the mobile terminal; wherein
      during the first transaction, the web browser obtains user subscription information for an initial over-the-air provisioning of the mobile terminal by the web browser with the web server; and
   conducting a second transaction between the web server and the web browser via the same external port of the mobile terminal; wherein
      during the second transaction, the mobile terminal obtains device management information, the device management information exchange between the web server and the web browser of the mobile terminal being initiated by the mobile terminal allowing the mobile terminal to access a corresponding network service,
   wherein the external port is a pin-hole through a firewall between the mobile terminal and the web server,
   the mobile terminal having not been activated for service by the service provider prior to the first and second transactions,
   wherein the second transaction includes the web browser obtaining at least one of a web application, an executable application and an automatic download and installation framework from the web server, the method further comprising,
   the web application, the executable application, or the automatic download and installation framework automatically contacting a device management module and passing the device management information to the mobile terminal.

22. The method of claim 21, wherein the first and second transaction occur before the mobile terminal accesses any network services of the wireless network.

* * * * *